United States Patent [19]

Aramaki

[11] Patent Number: 4,814,998
[45] Date of Patent: Mar. 21, 1989

[54] DIGITIZING METHOD

[75] Inventor: Hitoshi Aramaki, Tokyo, Japan

[73] Assignee: Fanuc Ltd., Yamanashi, Japan

[21] Appl. No.: 31,559

[22] PCT Filed: Jul. 1, 1986

[86] PCT No.: PCT/JP86/00339
§ 371 Date: Feb. 12, 1987
§ 102(e) Date: Feb. 12, 1987

[87] PCT Pub. No.: WO87/00266
PCT Pub. Date: Jan. 15, 1987

[30] Foreign Application Priority Data
Jul. 1, 1985 [JP] Japan .................................. 60-144157

[51] Int. Cl.[4] .......................... G01B 21/20; G05B 19/18
[52] U.S. Cl. .............................. 364/474.03; 364/474.35; 318/603; 318/621
[58] Field of Search ...................... 364/167–171, 364/177, 474–475; 318/601, 603, 618, 621, 568

[56] References Cited

U.S. PATENT DOCUMENTS

| 4,355,362 | 10/1982 | Imazeki et al. | 364/474 |
| 4,409,650 | 10/1983 | Noguchi | 364/177 X |
| 4,538,098 | 8/1985 | Matsui et al. | 318/624 X |
| 4,626,756 | 12/1986 | Inaba et al. | 364/513 X |
| 4,656,405 | 4/1987 | Kiya et al. | 364/474 X |
| 4,702,652 | 10/1987 | Rokksku et al. | 364/474 X |

Primary Examiner—Jerry Smith
Assistant Examiner—Allen MacDonald
Attorney, Agent, or Firm—Staas & Halsey

[57] ABSTRACT

A digitizing method for obtaining data indicative of the three-dimensional shape of an object by effecting movement along at least one axis (X or Y axis) under numerical control on the basis of path data and along another axis (Z) under tracer control and monitoring the present position along each axis. A numerial control unit performs numerical control to moving a tracer head in X and Y directions. A tracer control unit generates a Z-axis velocity command $V_z$ to move the tracer head along the Z axis. The numerical control unit counts pulses generated by a motor driving a tracer control axis to obtain the present position along the tracer control axis. The numerical control unit also obtains a commanded position along each numerical control axis (X,Y axes) by using the path data, and obtains a present position, represented by a machine position, by substracting an amount of servo-system delay (i.e., the contents of error registers) from the commanded position. Thereafter, each axial present position, represented by a machine position, is stored in a memory at predetermined time intervals.

6 Claims, 2 Drawing Sheets

DIGITIZING METHOD

BACKGROUND OF THE INVENTION

This invention relates to a digitizing method. More particularly, the invention relates to a digitizing method in which movement is effected along at least one axis under numerical control and along other axes under tracer control to obtain numerical data for specifying the three-dimensional shape of an object.

A digitizing method is available in which numerical data for specifying the three-dimensional shape of a model are obtained by moving a tracer head in the X-Y plane under numerical control, moving the tracer head along the shape of the model in the direction of the Z axis under tracer control, and sampling the present values along each axis at predetermined time intervals.

In this conventional digitizing method, a commanded position is taken as the present position with regard to the axis (numerical control axis) that is under numerical control, but the present position with regard to the axis (tracer control axis) under tracer control is obtained through a follow-up technique.

A present position monitoring method based on follow-up is one which the present position along an axis is monitored by counting a number of pulses each of which is generated whenever a motor for drive along the axis rotates a predetermined amount. The present position along the tracer control axis is the actual machine position.

With the conventional digitizing method, therefore, the present position along the numerical control axis is represented by the commanded position, the present position along the tracer control axis is represented by the machine position, and there is an error corresponding to the servo-system delay between the positions along the numerical control axis and tracer control axis. The problem that results is that highly precise digitizing cannot be performed.

SUMMARY OF THE INVENTION

Accordingly, an object of the present invention is to provide a digitizing method through which the present positions along the numerical control axis and tracer control axis can both be taken as machine positions, whereby highly precise digitizing can be carried out.

The present invention relates to a digitizing method for obtaining numerical data for the purpose of specifying the three-dimensional shape of an object by effecting movement along at least one axis (X or Y axis) under numerical control and along another axis (Z axis) under tracer control and reading the present position along each axis at predetermined time intervals.

Since velocity is commanded in tracer control, commanded position does not play a role in such control. Consequently, the present position along the tracer control axis is always the machine position. In numerical control, on the other hand, a target position is commanded, so that the present position along the numerical control is a commanded position. Accordingly, with regard to the numerical control axis, the machine position is obtained by substracting the amount of servo-system delay from the commanded position, and this machine position is taken as the present position.

In this manner the present positions along all of the axes can be obtained as machine positions to make highly precise digitizing possible.

In numerical control, commanded positions Xa, Ya along the X and Y axes are obtained by performing the operation indicated by the expressions $$Xa \pm \Delta X \rightarrow Xa, \quad Ya \pm \Delta Y \rightarrow Ya$$

at predetermined time intervals of $\Delta T$, where the amounts of movement produced along the respective axes over each time interval $\Delta T$ are $\Delta X$, $\Delta Y$. Further, the servo-system delays along the respective axes agree with the contents $E_x$, $E_y$ of error registers contained in these servo-circuits.

DESCRIPTION OF THE PREFERRED EMBODIMENT

Figure 1:
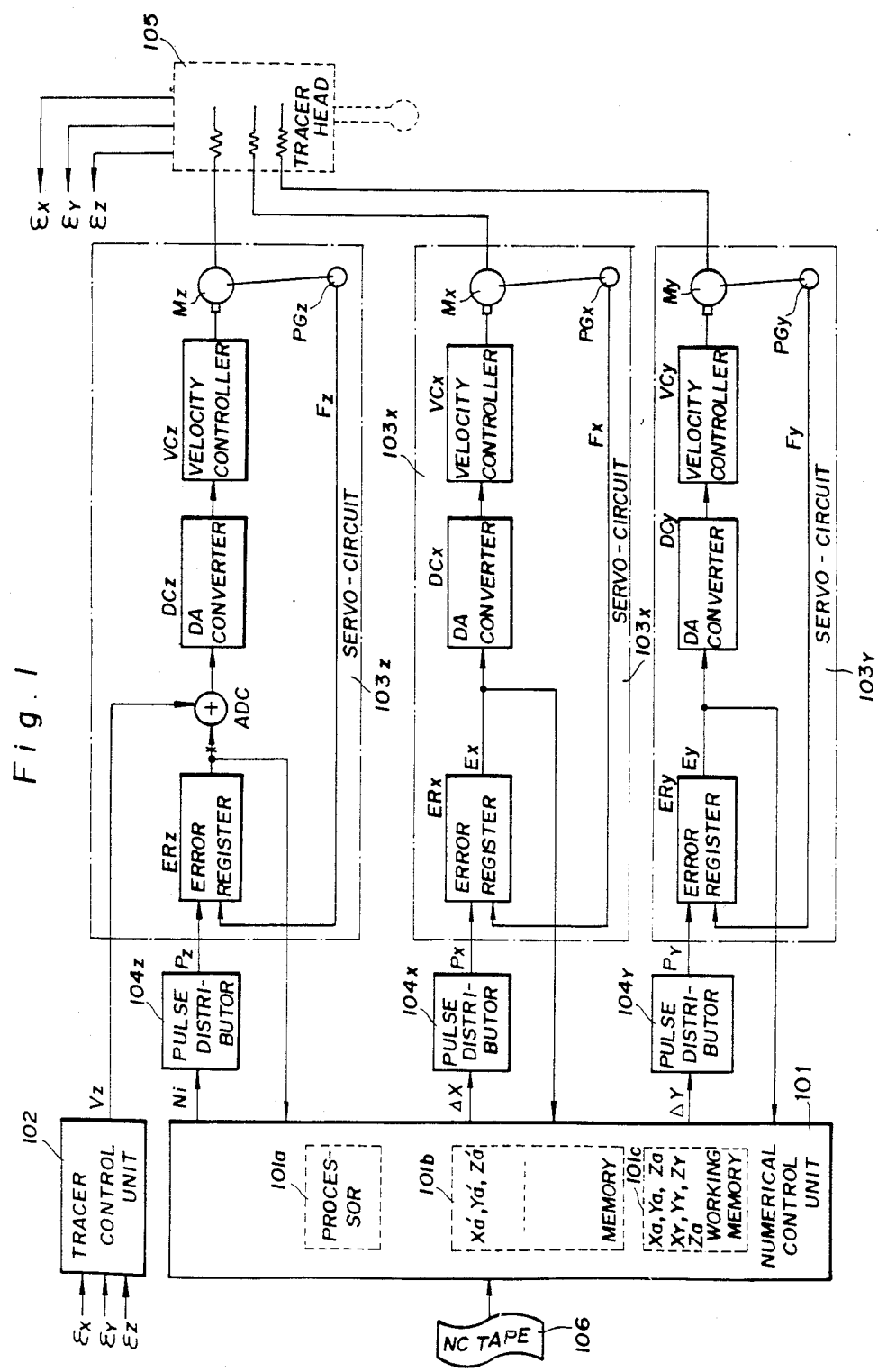
FIG. 1 is a block diagram of a system for executing digitizing processing in accordance with the present invention.

FIG. 1 is a block diagram of a system for realizing digitizing processing in accordance with the present invention, in which the Z axis is under tracer control and the X and Y axes are under numerical control.

Numeral 101 denotes a numerical control unit (NC unit), 102 a tracer control unit, 103X–103Z servocircuits for the respective axes, 104X–104Z pulse distributors, 105 a tracer head, and 106 an NC tape storing NC data.

The numerical control unit 101 comprises a computer and is adapted to numerically control the tracer head 105 along the X and Y axes on the basis of the NC data provided by the NC tape 106. These NC data are read from the NC tape 106 and stored in an internal memory 101b.

Figure 2A:
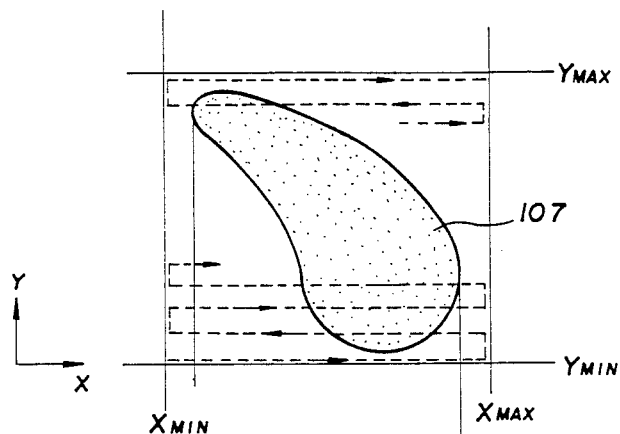
FIGS. 2(A) and (B) are explanatory views of axis control according to the present invention.

If these these NC data are for digitizing while two-way scan tracing is performed, by way of example, then the data are created in such a manner that the tracer head will move at a predetermined velocity along the dashed lines in the directions of the arrows shown in FIG. 2(A). FIG. 2(A) is a plan view and FIG. 2(B) a side view, in which numeral 105 denotes the tracer head and 107 designates a model. $X_{MIN}$, $X_{MAX}$ represent X-axis boundary coordinates of a tracing region, and $Y_{MIN}$, $Y_{MAX}$ represent Y-axis boundary coordinates of the tracing region.

The tracer control unit 102 has a well-known construction (see e.g. U.S. Pat. No. 4,355,362). The tracer control unit 102 uses three-dimensional displacement components $\epsilon_x$, $\epsilon_y$, $\epsilon_z$ along the respective axes to calculate and output a feed velocity $V_z$ along the Z axis, which is the tracer axis, as well as feed velocities $V_x$, $V_y$ along the X and Y axes, which are the feed axes, respectively. It should be noted that since feed axes X and Y are numerically controlled in the system of FIG. 1, $V_x$ and $V_y$ are not used in this system.

The X-and Y-axis servo-circuits 103X, 103Y under numerical control have exactly the same construction and include by error registers $ER_x$, $ER_y$, DA converters $DC_x$, $DC_y$, velocity controllers $VC_x$, $VC_y$, motors $M_x$, $M_y$, and pulse generators $PG_x$, $PG_y$, respectively.

The X-axis, servo-circuit 103Z under tracer control includes an error register $ER_z$, an adding circuit ADC, a DA converter $DC_z$, a velocity controller $VC_z$, a motor $M_z$ and a pulse generator $PG_z$. Since the tracer axis is the Z axis, the contents of the error register $ER_z$ are gated by a gate circuit, not shown, at the portion marked "X" so as not to be inputted to the adding circuit ADC.

Overall operation will now be described.

When digitizing is started by pressing a start button provided on an operator's panel, not shown, a processor 101a in the NC unit 101 reads already stored path data (NC data) out of the memory 101b, calculates amounts of movement $\Delta X$, $\Delta Y$ to be traversed along the X and Y axes, respectively, in a predetermined time interval $\Delta T$, and inputs these amounts of movement $\Delta X$, $\Delta Y$ to the pulse distributors 104X, 104Y, respectively, at the predetermined time interval $\Delta T$.

It should be noted that in the case of linear movement, $\Delta X$, $\Delta Y$ are calculated in accordance with the expressions $$X_i \cdot F \cdot \Delta T / \sqrt{X_i^2 + Y_i^2} \rightarrow \Delta X$$

$$Y_i \cdot F \cdot \Delta T / \sqrt{X_i^2 + Y_i^2} \rightarrow \Delta Y$$

where incremental values from a present position to a target position are represented by $X_i$, $Y_i$, and the commanded feed velocity is represented by F.

The pulse distributors 104X, 104Y perform pulse distribution calculations on the basis of the respective amounts of movement $\Delta X$, $\Delta Y$, and apply the resulting distributed pulses $P_x$, $P_y$ to the error registers $ER_x$, $ER_y$, respectively. If the direction of movement is positive, the error registers $ER_x$, $ER_y$ have their contents $E_x$ counted up one count at a time whenever the distributed pulses $P_x$, $P_y$ are generated. If the direction of movement is negative, these registers have their contents $E_x$ counted down one count at a time whenever the distributed pulses $P_x$, $P_y$ are generated. The contents $E_x$, $E_y$ of the error registers $ER_x$, $ER_y$ are converted into analog velocity voltages by the DA converters $DC_x$, $DC_y$, respectively, and these velocity voltages are applied to the velocity controllers $VC_x$, $VC_y$ to drive the motors $M_x$, $M_y$, respectively. Whenever the motors $M_x$, $M_y$ rotate through a predetermined angle, the pulse generators $PG_x$, $PG_y$ generate single position pulses $F_x$, $F_y$, which are fed back to the error registers $ER_x$, $ER_y$. If the direction of movement is positive, the error registers $ER_x$, $ER_y$ have their contents $E_x$, $E_y$ counted down one count at a time whenever the position pulses $F_x$, $F_y$ are generated. If the direction of movement is negative, these registers have their contents counted up one count at a time whenever the position pulses $F_x$, $F_y$ are generated. As a result, in the steady state, the contents $E_x$, $E_y$ of error registers $ER_x$, $ER_y$ are constant, the motors $M_x$, $M_y$ rotate at a constant velocity, and the tracer head 105 moves at a constant velocity (the commanded velocity F). It should be noted that the contents $E_x$, $E_y$ of the error registers indicate the amount of servo-system delay.

In concurrence with the foregoing control, the processor 101a of the NC unit 101 performs calculations indicated by the expressions $$X_a \pm \Delta X \rightarrow X_a$$

$$Y_a \pm \Delta Y \rightarrow Y_a$$

$$X_r - \Delta X \rightarrow X_r$$

$$Y_r - \Delta Y \rightarrow Y_r$$

at the predetermined time interval $\Delta T$ to update the X- and Y-axis commanded positions $X_a$, $Y_a$ and remaining amounts of movement $X_r$, $Y_r$ (the initial values are the incremental values $X_i$, $Y_i$) in the present block. The processor stores these in a working memory 101c. The processor also reads the contents $E_x$, $E_y$ of the error registers $ER_x$, $ER_y$, calculates present positions $X_a'$, $Y_a'$ along the X and Y axes in accordance with the expressions $$X_a - E_x \rightarrow X_a' \quad (1)$$

$$Y_a - E_y \rightarrow Y_a' \quad (2)$$

and stores these in the memory 101b. Thus, $X_a'$, $Y_a'$ are actual X- and Y-axis machine positions at the predetermined interval $\Delta T$.

The foregoing processing is repeated until the relation $X_r = Y_r = 0$ is established. When the relation $X_r = Y_r = 0$ is established, the next item of NC data is read and the same processing is performed.

Figure 2B:
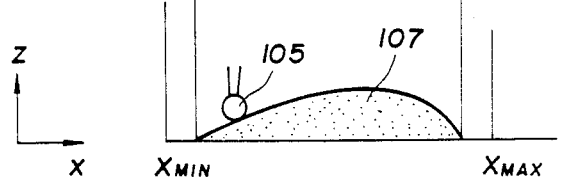

When the tracer head 105 moves under numerical control in the X-Y plane along the outer profile of a model (e.g. FIGS. 2(A) and 2(B)) the tracer head generates the axial displacements $\epsilon_x$, $\epsilon_y$, $\epsilon_z$, which conform to the shape of the model, and inputs these displacements to the tracer control unit 102. The latter performs well-known tracer computations to calculate a Z-axis velocity command $V_z$ (a digital value), and inputs the velocity command $V_z$ to the DA converter $DC_z$ via the adding circuit ADC. The DA converter $DC_z$ converts the inputted velocity command $V_z$ into an analog value, which is then applied to the velocity controller $VC_z$ to rotate the motor $M_z$ and transport the tracer head along the Z axis.

The processor in the numerical control unit 101 monitors the present position along the Z axis by the follow-up technique in concurrence with the above tracer control performed by the tracer control unit 102. Assume that the motor $M_z$ is rotated in the positive direction by the velocity command $V_z$ from the tracer control unit 102 and that N-number of position pulses $F_z$ generated by the pulse generator $PG_z$ in the predetermined time interval $\Delta T$. In such case, the counted value (initially zero) in the error register $ER_z$ becomes $-N1$. The counted value $-N1$ in error register $ER_z$ is read by the processor 101a of NC unit 101 at the predetermined time interval $\Delta T$. The processor of NC unit 101 then updates the Z-axis present position $Z_a'$ stored in the working memory 101c in accordance with the expression $$Z_a' + N_1 \rightarrow Z_a'$$

and applies the numerical value N1 to the pulse distributor 104Z. When N1 is issued as the command, the pulse distributor 104Z immediately performs a pulse distribution computation and outputs N1-number of distributed pulses $P_z$ before elapse of the next predetermined time interval $\Delta T$. The distributed pulses $P_z$ enter the error register $ER_z$, thereby updating its contents one count at a time in the positive direction. Accordingly, if the motor $M_z$ stops after N1-number of pulses are generated, the content of error register $ER_z$ will become zero owing to generation of the N1-number of pulses from the pulse distributor 104Z. However, if the motor $M_z$ continues to rotate, then the position pulses $F_z$ will still enter the substraction terminal of the error register $ER_z$ in concurrence with the aforementioned pulse distribution computation, so that the content of the error register will be updated one count at a time in the negative direction and, hence, will not become zero even when N1-number of pulses are generated by the pulse distributor 104. Thus, letting $t_1$ represent the sampling time at which the counted value N1 is read out of the error register $ER_z$, and assuming that N1-number of pulses $P_z$ are generated by the pulse distributor 104Z and N2-number of position pulses $F_z$ are generated by the next sampling time $t_2$ ($=t_1+\Delta T$), the content of the error register $ER_z$ will become $-N2$ at time $t_2$. The processor of NC unit 101 again reads the count $-N2$ out of the error register $ER_z$ at the sampling time $t_2$, performs the addition operation $$Z_a' + N2 \rightarrow Z_a'$$

to update the present position $Z_a'$, and applies the numerical value N2 to the pulse distributor 104Z as a command.

Thereafter, the processor reads the counted value $-Ni$ ($i=1, 2, \ldots$) out of the error register $ER_z$ at the predetermined times, performs the addition operation $$Z_a' + Ni \rightarrow Z_a' \quad (3)$$

and inputs the numerical value $N_i$ to the pulse distributor 104Z. This is followed by repeating the foregoing operation, whereby the present position $Z_a'$ is updated constantly on a real-time basis.

Thus, by performing the operations of Eqs. (1) through (3) at the predetermined time interval $\Delta T$, the present positions (actual machine positions) $X_a', Y_a', Z_a'$ along the respective axes are successively sampled and stored in the memory 101b of NC unit 101 to generate the three-dimensional shape of the model in the memory. These three-dimensional shape data are outputted whenever required.

A case has been described above in which the machine position ($X_a', Y_a', Z_a'$) is stored in the memory 101b at the time interval $\Delta T$. However, it can be so arranged that a predetermined value conforming to the machine position is checked to determine if it exceeds an allowed value, and the machine position is stored in the memory 101b only when the above condition holds.

Figure 3:
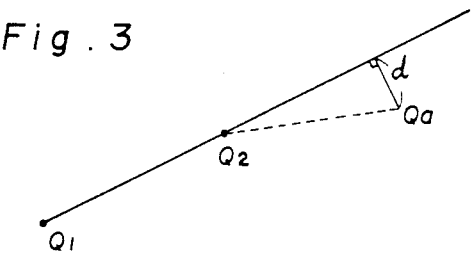
FIG. 3 is an explanatory view of machine position sampling.

For example, in FIG. 3, assume that the two latest points already digitized are $Q_1, Q_2$, and that a sampled machine position is $Q_a$. A distance d from the point $Q_a$ to the straight line $Q_1Q_2$ is calculated, and this distance d is compared with a preset allowed value A. If d is less than the allowed value, the sampled present position is not digitized (not stored in memory 101b). However, if d>A holds, namely if the distance d exceeds the allowed value, then the machine position data ($X_a', Y_a', Z_a'$) are stored in the memory 101b.

Further, the NC unit 101 and tracer control unit 102 are provided separately in the above arrangement. However, these may be combined into one unit. In addition, though it has been described that the traveling velocities along the numerical control axes are given by the NC data, it is permissible to adopt velocities $V_x, V_y$, which are obtained by an ordinary tracer calculation using the axial displacements $\epsilon_x, \epsilon_y, \epsilon_z$, as the traveling velocity F along X and Y axes.

Thus, in accordance with the present invention, the arrangement is such that the present position along the tracer control axis is obtained by counting the pulses generated whenever the motor for drive along the tracer control axis rotates through a predetermined angle, and the present position with regard to the numerical control axis is obtained by subtracting the amount of servo-system delay from the commanded position. As a result, the present position along each axis can be obtained as the actual machine position so that highly precise digitizing of a three-dimensional shape can be performed.

I claim:

1. A digitizing method for obtaining numerical data specifying a three-dimensional shape of an object by effecting movement of a head along one axis under numerical control of a motor on the basis of path data and along other axes under tracer control of another motor and monitoring a present position of the head along each axis, said method comprising the steps of:
   (a) obtaining a present position along one of the other axes by counting pulses generated by movement of the head along one of the other axes;
   (b) obtaining a commanded position along the one axis by using the path data;
   (c) obtaining a first difference between a commanded amount of movement defined by the path data and an actual amount of movement along the one axis;
   (d) obtaining a present position along the one axis by subtracting the first difference from the commanded position; and
   (e) storing the present position along each axis in memory.

2. A digitizing method according to claim 1, wherein step (a) comprises the substeps of:
   counting a first number of pulses corresponding to movement of the head along the one of the other axes;
   counting a second number of pulses corresponding to movement of the another motor;
   obtaining a value Ni, at predetermined time intervals $\Delta T$, corresponding to the difference between the first and second number of pulses;
   updating the present position $Z_a'$ along the one of the other axes by performing the operation $$Z_a' + Ni \rightarrow Z_a' \text{ and}$$

generating a number of pulses corresponding to the value Ni.

3. A digitizing method according to claim 1, further comprising the steps of:
   calculating the commanded amount of movement at predetermined time intervals $\Delta T$ using the path data; and
   obtaining the commanded position by accumulating said commanded amount of movement every $\Delta T$.

4. A digitizing method according to claim 3, wherein step (c) comprises the substeps of:
   generating a first number of pulses by performing a pulse computation on the basis of the commanded amount of movement every $\Delta T$; and
   calculating a difference between the first number of pulses and a number of pulses corresponding to a predetermined amount of movement along the one axis.

5. A digitizing method according to claim 1, wherein step (e) comprises the substep of:
   storing the present position along each axis at predetermined time intervals $\Delta T$.

6. A digitizing method according to claim 1, wherein step (e) comprises the substep of:

calculating a distance d from the present position along each axis at predetermined time intervals $\Delta T$ to a straight line connecting two prior present positions;

determining whether said distance d is greater than a predetermined set value A; and storing a present position when $d > A$.

* * * * *

UNITED STATES PATENT AND TRADEMARK OFFICE
CERTIFICATE OF CORRECTION

PATENT NO. : 4,814,998

DATED : 3/21/89

INVENTOR(S) : Hitoshi Aramaki

It is certified that error appears in the above-identified patent and that said Letters Patent is hereby corrected as shown below:

Col. 4, line 44, "N-" should be --N1--.

Signed and Sealed this

Twenty-fourth Day of October, 1989

Attest:

DONALD J. QUIGG

*Attesting Officer*     *Commissioner of Patents and Trademarks*